(No Model.)
D. DART & T. R. PARKER.
TRANSPORTABLE ELEVATOR FOR GOODS.
No. 519,447. Patented May 8, 1894.
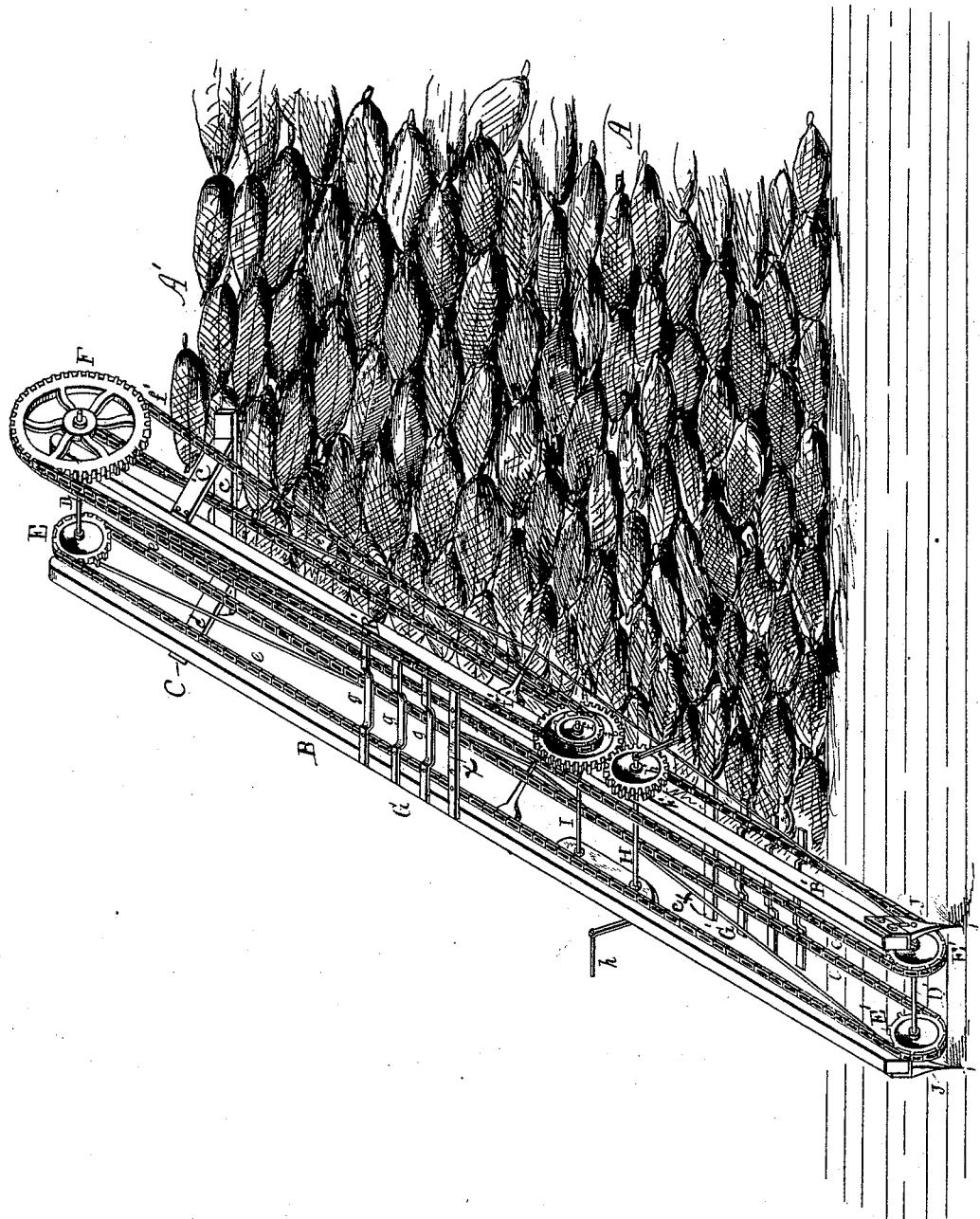
WITNESSES
Joseph Small
G. M. Copenhaver.
INVENTORS
Daniel Dart
Theodore R. Parker
Per W. R. Singleton
Attorney

UNITED STATES PATENT OFFICE.

DANIEL DART AND THEODORE R. PARKER, OF BINGHAMTON, NEW YORK.

TRANSPORTABLE ELEVATOR FOR GOODS.

SPECIFICATION forming part of Letters Patent No. 519,447, dated May 8, 1894.

Application filed October 13, 1892. Serial No. 448,743. (No model.)

*To all whom it may concern:*

Be it known that we, DANIEL DART and THEODORE R. PARKER, citizens of the United States, residing at Binghamton, in the county of Broome and State of New York, have invented certain new and useful Improvements in Transportable Elevators for Goods; and we do hereby declare the following to be a full, clear, and exact description of the invention, such as will enable others skilled in the art to which it appertains to make and use the same.

This invention relates to improvements in transportable elevators for piling up bags, &c., which will be hereinafter more particularly described and pointed out.

In the accompanying drawing forming part of the specification the figure represents the elevator in use.

A. represents a pile of bags filled with grain or other material which has been put up as high as convenient for men to lift. The elevator is then placed on the pile A—as shown.

The elevator consists of two rails B. B' which are properly secured together at the upper ends by the standard-frame C—which consists of the bottom plate $c$ and two standards $c'$. $c'$.—bolted at their top ends to the rails B. B'. At the upper end of the elevator is a shaft D—which has its bearings in suitable journal boxes under the rails B. B'—and on said shaft D— are two sprocket wheels E, one of which only is seen in the drawing. There is also on the shaft D a larger sprocket wheel F. At the lower end of the rails B. B'. there is a shaft D'. having its bearings in suitable journal boxes under the rails—and on the shaft D' are two sprocket wheels E' to correspond with the upper wheels E; and over these sprocket wheels there are sprocket chains $e$, $e$. The drawing shows two baskets or bearers G, G', which are secured to the sprocket chains in any suitable manner. Any number of these bearers may be used to suit the height of the rails. At a convenient distance from the bottom of the rails to suit the working of a crank—by man power, there is a transverse shaft H supported in suitable journal boxes underneath the rails B. B'.

At each end of the shaft H is a crank handle $h$. On the shaft is a gear wheel $h'$—which meshes with a gear-wheel $i$ on the outer end of a shaft I. supported in the same manner as shaft H. Outside of gear wheel $i$ is a small sprocket wheel $f$. which is connected with sprocket wheel F by a sprocket chain $f'$. At the lower end of the rails B. B'— are strong metallic feet J. J. having sharp toes $j$. $j$. These supports are long enough to raise the rails so far above the floor, that the bearers G G' on their return can pass freely over the sprocket wheels E'— at the bottom. The bars $g$. of the bearers rest, at each end, upon the rails to prevent the load from pressing the bearers down between the rails.

The bearers (G) are constructed of the metal or wooden slats or bars $(g)$ $(g)$ $(g)$ and $(x)$ which are secured near their ends to the sprocket chains $(e)$ $(e)$. The ends of these bars rest upon these rails (B) (B'), thus preventing them from sagging down between the rails when loaded. The bars $(g)$ $(g)$ $(g)$ are bent or curved inwardly between the rails, while the bar $(x)$ is straight serving as a stop to prevent the packages from slipping off in transit. There may be any number of the bars $(g)$, and they may be placed closer together to hold the package. One or more of the bearers may be used on a conveyer, according to the length of the rails.

We are aware that elevators or conveyers having rails, frame, sprocket wheels and chains, are in use, but

We claim as our invention—

In a portable, hand power elevator for goods, the combination, the rails (B) and the sprocket chain $(f)$, of the bearers (G) composed of the inwardly bent bars $(g)$ $(g)$ $(g)$, and the straight bar $(x)$, substantially as described, and for the purpose specified.

In testimony whereof we affix our signatures in presence of two witnesses.

DANIEL DART.
THEODORE R. PARKER.

Witnesses:
DENNISON D. OSTERHOUT,
A. F. WARD.